United States Patent Office 3,483,761
Patented Dec. 16, 1969

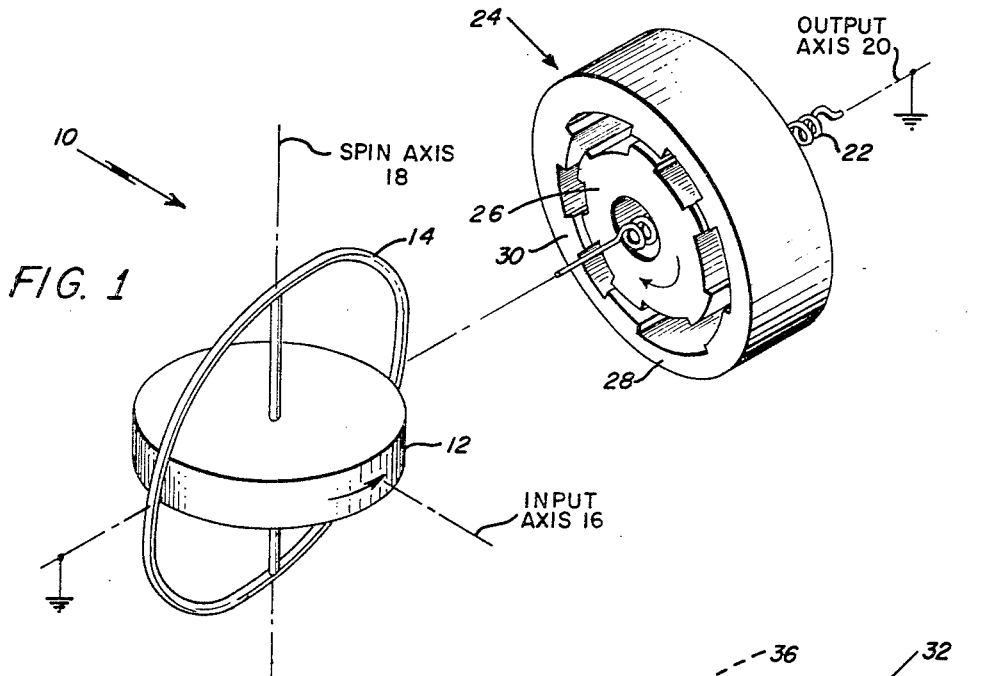
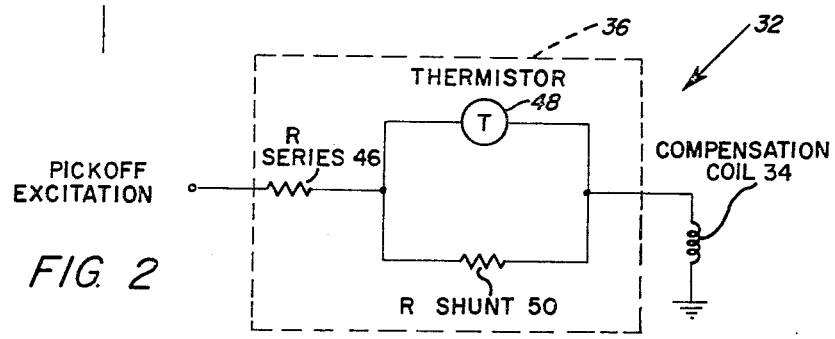
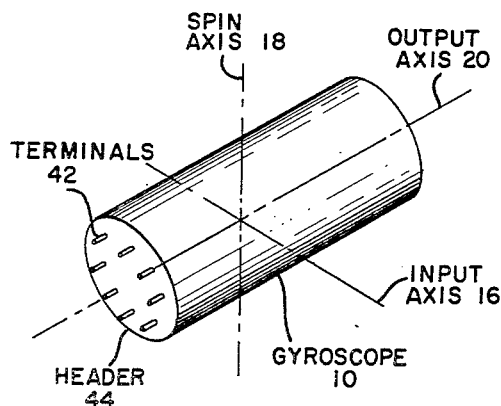
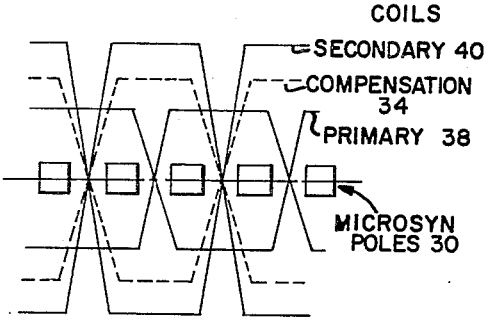

3,483,761
THERMAL NULL SHIFT COMPENSATOR
Warren W. Houghton, Manchester, and Robert C. Royce, Framingham, Mass., assignors to Raytheon Company, Lexington, Mass., a corporation of Delaware
Filed May 26, 1967, Ser. No. 641,644
Int. Cl. G01c 19/28
U.S. Cl. 74—5.6                    3 Claims

ABSTRACT OF THE DISCLOSURE

Apparatus for cancelling a null shift caused by temperature in a rate gyroscope. A thermistor network and compensating coil are added to the microsyn for generating an artificial null which subtracts from the gyroscope null.

BACKGROUND OF THE INVENTION

This invention is concerned with positional pickoff devices and, more particularly, with rate gyroscopes.

Present day missiles require that about forty percent of the gyroscopes used in each missile have good thermal null shift characteristics. These gyroscopes are obtained by measuring the thermal null shift characteristics and selecting the best produced. Heaters are often used to meet the missile requirements, but gyroscopes with heaters have the disadvantages of reduced reliability, large power requirements, increased physical size, and appreciable warm-up and settling time. By the use of the compensator disclosed herein, the heaters may be eliminated with a resulting reduction in size and power consumption. In addition, gyroscopes with thermal null shifts exceeding the specification can be corrected if the null shift is repeatable, thus salvaging gyroscopes which might otherwise be unusable.

SUMMARY OF THE INVENTION

A thermal null shift compensator for a positional pickoff device which automatically stabilizes the null output of the device over a wide range of temperatures. The compensator comprises a compensating coil and a thermistor network. The thermistor network is a temperature sensitive circuit which regulates an output current proportional to the pickoff temperature. When the thermistor network is connected to the compensator coil, a null which varies with temperature is produced in response to the network current. This artificial null variation is equal and opposite to the inherent thermal null shift of the pickoff, thus cancelling it.

BRIEF DESCRIPTION OF THE DRAWINGS

FIG. 1 is a schematic diagram of a rate gyroscope;
FIG. 2 is a schematic diagram of a thermistor network and compensation coil;
FIG. 3 is a schematic diagram of the microsyn poles with coils; and
FIG. 5 is a schematic diagram of a rate gyroscope case.

DESCRIPTION OF THE PREFERRED EMBODIMENT

A rate gyroscope 10, shown in FIG. 1, utilizes a spinning mass of rotor 12 supported in a gimbal system 14 to detect rates about an input axis 16 orthogonal to the spin axis 18. The input rate causes the gyroscope 10 to attempt to precess about an output axis 20 which is orthogonal to both the spin axis 18 and the input axis 16. Both the spin axis 18 and output axis 20 may comprise bearing assemblies. The output axis 20 is restrained by a torsional spring 22 such that the output axis 20 moves through an angle $\phi$ which is proportional to the input rate. The output angle is measured with a microsyn 24 which is an electromagnetic transducer. Microsyn 24 comprises a rotor 26 and a stator 28 which includes a plurality of poles 30. The microsyn output is initially adjusted for a null with no rate input at room temperature. Temperature variations cause changes in the microsyn output, however, and produce erroneous signals that appear as changes in input rate.

The inventive thermal null shift compensator 32 is a device for automatically stabilizing the null output of a rate gyroscope with a variable reluctance pickoff over a wide range of temperatures and is shown in FIG. 2. The compensator deivce 32 comprises a compensator coil 34 connected to a thermistor network 36. As depicted in FIG. 3, the compensator coil 34 includes a plurality of wire turns which are wound on top of the primary coil 38 of the microsyn variable reluctance pickoff 24 and connected to two terminals 42 located externally on the gyroscope header 44. The microsyn variable reluctance pickoff 24 is a multipole magnetic device which senses the rotary motion of the gyroscope about its output axis 20. The gyroscope 10 is a sealed can as shown in FIG. 4 whose header 44 is the end of the sealed case where wires are brough out through drilled holes to terminals 42. FIG. 3 is a schematic diagram showing the location of the compensation coil 34 with regard to the microsyn poles 30 and coils 38 and 40. These poles 30 are connetced at their bottom, and each comprises a plurality of laminations which are glued together. The compensation coil 34 is wound in a manner similar to the secondary winding 40 and hence acts as a secondary. The thermistor network 36 is a temperature sensitive circuit which is shown schematically in FIG. 2 and comprises a series resistor 46 connected to the parallel combination of a thermistor 48 and a shunt resistor 50. Also shown is the manner in which the compensating coil 34 is connected to the thermistor network 36. The physical size of the components of the thermistor circuit 36 are comparatively small, permitting the entire circuit to be encapsulated on the header 44 with an epoxy covering.

The compensator coil 34 produces an artificial pickoff null which varies linearly as a function of the current through this coil 34. The thermistor network 36 produces an output current which is proportional to the pickoff temperature. Therefore, when the thermistor network 36 is connected to the compensator coil 34, the artificial null produced varies with temperature. By selectively choosing the circuit components, this artificial thermal null variation is made equal and opposite to the inherent thermal null shift of the pickoff 24, thus cancelling it out and producing a pickoff output which has negligible net thermal null shift.

The pickoff is a microsyn angle measuring device 24 which measures angular rotation by the distribution of magnetic flux. The microsyn 24 of FIG. 1 comprises the fixed poles 30 and rotary core 26. These poles 30 regulate the flux. When the pickoff rotor 26 is centered, the magnetic flux distributed equally among the poles 30. If the rotor 26 is displaced slightly, the magnetic flux is unbalanced in proportion to the angular displacement with a resultant electrical secondary output at the associated pickoff terminals 42 on the header 44. When the distribution of the magnetic flux is unbalanced electromagnetically, the resulting output at the pickoff terminals 42 has all the characteristics of an angular displacement or a null shift even though it is caused by a temperature change. The compensator coil 34 is wound on the pickoff stator 28 in order to produce this shift. When a current in phase with the pickoff primary winding current is passed through the compensation coil 34 the induced flux adds to the flux in one half of the poles 30 and subtracts from the flux in the other half with a resulting flux unbalance and a net output at the pickoff secondary terminal 42. This output is directly proportional to the magnitude of the applied compensation current. Reversing the phase of the current flow in the compensator coil 34 causes the flux unbalance to reverse with a net output in the opposite direction at the pickoff secondary terminals 42.

The schematic diagram of the compensator network 32 shown in FIG. 2 demonstrates that the current through the compensator coil 34 is controlled by the thermistor-resistor network 36 which essentially provides a series impedance that varies inversely with temperature. The variation of the thermistor impedance is non-linear or an exponential function. The fixed shunt resistor 50 is selected to linearize the resistance variation with temperature as well as to set the absolute resistance at any temperature. The series resistor 46 acts as a bias which shifts the total resistance of the network 36 at any given temperature and thus adjusts the fixed amount of current through the compensator coil 34. Accordingly, by a proper selection of components, the thermistor network 36 provides current to the compensator coil 34 which varies over a specified range as the temperature varies.

The inventive compensator described herein permits the minimization of null shift with a resulting improvement in such things as missil guidance accuracy and kill probability. Additionally, the compensator may be used in linear or angular accelerometers, linear motion transducers, or any device using a variable reluctance type pickoff.

We claim:

1. A variable reluctance pickoff means comprising a gyroscope having a microsyn having a multi-pole stator and a coil wound around the stator for generating a null signal, in combination with a null shift compensator for the variable reluctance pickoff means comprising:

thermistor means for regulating a current in response to pickoff temperatures; and compensator coil means coupling the thermistor means for generating a thermal null, the compensator coil means being wound around the stator and operatively subtracting the thermal null signal from the pickoff null signal.

2. A null shift compensator according to claim 1, wherein the thermistor means comprise:

a resistor; and a thermistor coupled in series relation with the resistor.

3. A null shift compensator according to claim 1, wherein the pickoff means comprise a header;

the thermistor means includes a first resistor encapsulated on the header and means encapsulated on the header and connected in series with the first resistor and including a thermistor connected in parallel with a second resistor.

References Cited

UNITED STATES PATENTS

| | | | |
|---|---|---|---|
| 2,894,395 | 7/1959 | Soland | 74—5.6 |
| 2,908,168 | 10/1959 | Maynard et al. | 74—5.6 |
| 3,276,271 | 10/1966 | Lally et al. | 74—5.6 |

FRED C. MATTERN, JR., Primary Examiner

M. ANTONAKAS, Assistant Examiner

U.S. Cl. X.R.

74—5